United States Patent Office 3,373,804
Patented Mar. 19, 1968

3,373,804
HEAVY OIL RECOVERY
Eugene D. Glass, Tulsa, and Colonel J. Russell, Jr., Bartlesville, Okla., assignors to Cities Service Oil Company, a corporation of Delaware
No Drawing. Filed Nov. 19, 1964, Ser. No. 412,347
4 Claims. (Cl. 166—2)

This invention relates to the recovery of heavy oil from subterranean reservoirs. More particularly, it relates to a method for recovering heavy oil by means of a gas drive that simultaneously reduces the viscosity of heavy oil in the reservoir and supplies the external driving force necessary to recover reduced viscosity oil from the formation at efficient production rates.

Numerous methods have been proposed for recovering heavy oils, tars, and similar carbonaceous substances from underground reservoirs, including water, gas and underground combustion drives. As indicated in U.S. Patent No. 3,064,728, such methods have not been generally successful in formations containing very viscous oil since they do not effect both a reduction of the viscosity of the oil in the vicinity of the producing well, so as to enable the oil to move readily into the wellbore, and simultaneously apply pressure by injection of a driving fluid into a neighboring well so that a pressure differential is set up between the wells. In order to move highly viscous oil at a desirable rate, it is necessary not only to drive the oil toward the producing well by external pressure applied to the formation but also to increase the mobility of the oil around the producing well by viscosity reduction.

It is an object of this invention to provide an improved method for recovering highly viscous oils from underground reservoirs.

It is another object of this invention to provide a method for recovering highly viscous oils from underground formations at efficient production rates.

It is another object of this invention to provide a method for recovering highly viscous oils in which the viscosity of the oil in the reservoir is reduced while simultaneously applying a driving force sufficient to obtain efficient production of reduced viscosity oil at the production wellbore.

These and other objects and advantages of the present invention will become apparent from the following detailed description of the invention.

The objects of the present invention are obtained by injecting a mixture of oil soluble and insoluble gases into a reservoir of highly viscous oil penetrated by at least two spaced wells. Thus, the oil soluble gas will be stripped from the mixture and absorbed in the highly viscous oil in the vicinity of the injection well. As a result, the viscosity of this oil containing the dissolved gas will be decreased and its volume correspondingly increased in accordance with the partial pressure of the oil soluble gas in the injected gas mixture. Injection of the gas mixture is continued until such time as a bank of oil in the vicinity of the injection wellbore becomes saturated with the soluble gas. In accordance with this invention, the insoluble gas that travels through the formation may be produced from an offset well, together with small amounts of the highly viscous oil in the vicinity of the offset well.

After obtaining a saturated bank of reduced viscosity oil in the vicinity of the original injection wellbore, injection into this wellbore is stopped, and the gas mixture is subsequently injected into the offset well. The original injection well is then employed as a production well. Upon reversing the direction of gas flow in this manner, the same process occurs at the new injection well that previously occurred at the original injection well. That is, the oil soluble component of the gas mixture is absorbed in the highly viscous oil in the vicinity of the new injection well, thereby reducing the viscosity of the oil in that area. The insoluble component of the gas mixture travels through the formation in the direction of the original injection well, now used as a production well. As the insoluble gas approaches the original injection well, however, it encounters the bank of reduced viscosity oil obtained during the original gas injection. As a result, the flow of insoluble gas tends to drive the reduced viscosity oil in the vicinity of the original injection well into that wellbore, from which it can be produced together with the insoluble gas.

The less viscous oil containing dissolved injection gas and the insoluble driving gas are produced at the original injection well until the viscosity of the produced oil eventually approaches the original viscosity of the oil in the formation. At this point, the bank of reduced viscosity oil has been diminished, and the production rate decreases so that it is no longer economical to recover the viscous product being produced at that wellbore. Thereafter, the second phase injection well is put back on production, and the original injection well is once again used for the injection of the gas mixture into the formation. Thus, a cyclic process is established wherein an oil soluble and insoluble gas mixture is injected alternately into one of two offset wells, or sets of wells, while the other well, or set of wells, is placed on production. Injection into either well continues until the corresponding production rate falls to the point where economics dictate where the cycle should be reversed.

After a number of such cycles, oil production from one well may be sufficient to make alternate injection and production from that well inefficient. When this occurs, it is likely that the reservoir has become saturated with the soluble gas so that the viscosity of the oil throughout the contacted area of the formation has been reduced to the point where frontal displacement would be possible. Continued gas injection into one well, or set of wells, and production from the offset well, or set of wells, could be continued until economic depletion of the reservoir has been accomplished. Alternately, further production of the reduced viscosity oil could be obtained by conventional waterflood or gas drive methods such as those employed in the secondary recovery of light oils.

In accordance with the present invention, the gas injected into the heavy oil-containing formation must be a mixture of at least one oil soluble and at least one oil insoluble gas. Gases that are soluble in oil and are suitable as the oil soluble component of the gas mixture include methane, ethane, propane, butane, isobutane, ethylene, propylene, acetylene, hydrogen sulfide, carbon dioxide, and mixtures of these gases, such as natural gases. The insoluble component of the gas mixture may be any relatively insoluble gas such as air or nitrogen. In regions where flue gas is readily available, it is convenient to clean up the flue gas and inject it into a heavy oil reservoir as a reasonably pure mixture of nitrogen and carbon dioxide.

The amount of gas to be injected into the reservoir, the relative proportions of soluble and insoluble components in the injection gas, and the injection pressure are all interrelated and dependent upon such factors as the initial formation pressure, the bubble point of the oil in the reservoir, the solubility of the oil-soluble component of the gas, and the nature of the particular oil in place. In order for the soluble gas component to dissolve in the oil, the injection pressure must exceed the bubble point pressure of the oil in the reservoir. Likewise, if the insoluble gas component is to pass through the formation and drive reduced viscosity oil into the production well, the injection pressure must also exceed the formation pressure so that a pressure gradient is maintained between the injection and producing wells.

As indicated above, the present invention contemplates the establishment of an area of reduced viscosity oil in the vicinity of the production well. The viscosity of the oil is dependent upon the number of moles of the soluble gas dissolved in the initially heavy oil. The solubility of the soluble gas is, in turn, dependent upon the pressure in the vicinity of the production wellbore. It is necessary, therefore, to maintain sufficient back pressure at the production well to prevent the soluble gas from leaving solution. This may be readily accomplished by raising the position of the production pump in the wellbore above the producing interval.

The relative amounts of oil soluble and oil insoluble gases used in the mixture may vary widely depending upon the total amount of gas injected into the formation during any particular cycle and the solubility of the oil soluble component. A sufficient quantity of the gas mixture should be injected, in any one cycle, so that the amount of oil soluble gas absorbed in the highly viscous oil is sufficient to produce a sizable bank of reduced viscosity oil in the vicinity of the injection well. If the bank of reduced viscosity oil in the vicinity of a well is too small, an excessive number of cycles will be required to achieve the desired result. If, on the other hand, an excessively large bank of reduced viscosity oil is established before reversing the gas flow, the advantages of the simultaneous reducing of viscosity and applying of a driving pressure will not be realized. Depending upon the particular factors present in any particular application, the percentage of oil-soluble gases in the injection gas mixture may vary generally from about 10% to about 90% of the total gas in the injection gas mixture.

The quantity of oil-insoluble gas in the injection mixture must be such that a sufficient amount of insoluble gas moves through the reservoir to drive the bank of reduced viscosity oil into the production wellbore. Any excess of oil insoluble gas beyond that needed to drive the reduced viscosity bank will simply operate on highly viscous oil that cannot efficiently be driven into the production wellbore.

Although the invention has been described in relation to a formation having two offset wells, it will be appreciated that the present invention is applicable to a formation having a plurality of spaced wells. In this case, the gas mixture is first introduced into one set of wells and production is obtained from the remaining set of offset wells. By means of a judicious spacing of the wells, together with an optimum selection of such factors as quantity of gas injected, relative proportions of soluble and insoluble components, number of flow reversals, an efficient recovery of highly viscous heavy oil from an underground formation can be obtained.

It will be understood that various changes in the description contained herein in order to explain the nature of the invention may be made by those skilled in the art within the principle and scope of the invention as expressed in the appended claims.

We claim:

1. A method for removing a high-viscosity oil from a subterranean reservoir penetrated by at least two spaced wells comprising:

(a) injecting a mixture of normally gaseous oil soluble and oil insoluble components, said mixture comprising from about 10% to about 90% of normally gaseous oil soluble components, into the reservoir through one of said wells until a bank of oil in the vicinity of that well becomes saturated with said normally gaseous, oil soluble component, thus reducing the viscosity of the oil in that bank, the normally gaseous, oil insoluble component travelling through said reservoir in the direction of the offset well, the injection pressure being in excess of the bubble point of the oil in the reservoir so that the soluble component may dissolve in the oil and likewise sufficiently in excess of the reservoir pressure so as to enable a pressure gradient to be maintained between the injection well and the offset well, the temperature of the normally gaseous oil soluble and insoluble components injected being that obtained during compression to injection pressure;

(b) subsequently injecting said mixture of normally gaseous oil soluble and insoluble components into the reservoir through the offset well so as to saturate a bank of oil in the vicinity of said offset well, thereby reducing the viscosity of the oil in that bank, the normally gaseous oil insoluble component travelling through said reservoir and driving the previously formed bank of reduced viscosity oil in the vicinity of the original injection well into that well-bore;

(c) reversing the direction of gas flow through the reservoir whenever the production rate decreases so as to indicate that the bank of reduced viscosity oil in the vicinity of the production well has been depleted, whereby the injection of the mixture of normally gaseous oil soluble and insoluble components serves to reduce the viscosity of the oil in the vicinity of the well then used as an injection well while simultaneously providing the driving force to remove reduced viscosity or oil at an efficient production rate from the offset well then employed as a production well.

2. The method of claim 1 in which the cyclic operation is continued until the reservoir has become essentially saturated with the soluble gas.

3. The method of claim 2 and including the subsequent recovery of reduced viscosity oil from one well by means of energy supplied through the offset well.

4. The method of claim 1 in which the mixture of oil soluble and insoluble gases is flue gas.

References Cited

UNITED STATES PATENTS

| 2,412,765 | 12/1946 | Buddrus et al. | 166—2 X |
| 2,862,558 | 12/1958 | Dixon | 166—11 X |
| 2,875,830 | 3/1959 | Martin | 166—7 |
| 2,958,380 | 11/1960 | Schild | 166—11 |
| 3,064,728 | 11/1962 | Gould | 166—11 X |
| 3,252,512 | 5/1966 | Baker et al. | 166—9 X |
| 3,266,569 | 8/1966 | Sterrett | 166—9 X |

STEPHEN J. NOVOSAD, *Primary Examiner.*